(12) United States Patent
Forsman et al.

(10) Patent No.: US 10,244,106 B2
(45) Date of Patent: Mar. 26, 2019

(54) METHODS AND SYSTEMS FOR VERIFYING USERS BY TELEPHONE NUMBERS

(71) Applicant: Sinch AB, Nacka Strand (SE)

(72) Inventors: Daniel Forsman, Lidingo (SE); Bjorn Fransson, Spanga (SE); Michail Rikakis, Enskede (SE)

(73) Assignee: SINCH AB, Nacka Strand (SE)

( * ) Notice: Subject to any disclaimer, the term of this patent is extended or adjusted under 35 U.S.C. 154(b) by 201 days.

(21) Appl. No.: 14/969,233

(22) Filed: Dec. 15, 2015

(65) Prior Publication Data

US 2016/0286041 A1    Sep. 29, 2016

Related U.S. Application Data

(60) Provisional application No. 62/138,145, filed on Mar. 25, 2015.

(51) Int. Cl.
| | |
|---|---|
| *H04W 12/00* | (2009.01) |
| *H04M 3/42* | (2006.01) |
| *H04W 4/16* | (2009.01) |
| *H04M 3/22* | (2006.01) |

(52) U.S. Cl.
CPC ....... *H04M 3/42059* (2013.01); *H04M 3/229* (2013.01); *H04W 4/16* (2013.01); *H04M 2201/18* (2013.01); *H04M 2203/6081* (2013.01); *H04W 12/00* (2013.01)

(58) Field of Classification Search
CPC .................................................... H04L 63/126
USPC ........................................................ 455/415
See application file for complete search history.

(56) References Cited

U.S. PATENT DOCUMENTS

| | | | |
|---|---|---|---|
| 5,995,603 | A | 11/1999 | Anderson |
| 6,285,750 | B1 | 9/2001 | Brachman et al. |
| 8,923,812 | B1 | 12/2014 | Koum et al. |
| 8,964,951 | B1 | 2/2015 | Brahm et al. |
| 9,161,222 | B2 | 10/2015 | Barkan |
| 9,161,223 | B2 | 10/2015 | Barkan |
| 9,167,431 | B2 | 10/2015 | Barkan |

(Continued)

FOREIGN PATENT DOCUMENTS

WO    WO2014189882 A1    11/2014

OTHER PUBLICATIONS

PCT Application No. PCT/SE2015/051330, Search Report dated Jul. 1, 2016, 5 pages.

(Continued)

*Primary Examiner* — Marcus Hammonds
(74) *Attorney, Agent, or Firm* — K&L Gates LLP (57) ABSTRACT

A verification process is executed between a software-controlled communication device and a software-controlled server in a network to verify that an unconfirmed telephone number, which is transmitted to the server, corresponds to an actual subscription telephone number and that this subscription telephone number is assigned to the communication device. In the verification process, the server initiates a verification call to the unconfirmed telephone number from a selected calling telephone number. The communication device intercepts the verification call, identifies the originating telephone number, and transmits the originating telephone number to the server. The verification succeeds if the originating telephone number matches the calling telephone number.

15 Claims, 8 Drawing Sheets

(56) References Cited

U.S. PATENT DOCUMENTS

| | | | |
|---|---|---|---|
| 9,338,287 B1* | 5/2016 | Russo | H04W 12/06 |
| 2006/0153346 A1 | 7/2006 | Gonen et al. | |
| 2010/0135477 A1 | 6/2010 | Chen | |
| 2011/0246366 A1 | 10/2011 | Lai | |
| 2015/0038131 A1 | 2/2015 | Wen | |
| 2015/0230089 A1 | 8/2015 | Barkan | |
| 2016/0150405 A1* | 5/2016 | Soulez | H04W 40/12 |
| | | | 455/415 |

OTHER PUBLICATIONS

European Patent Application No. 15886620.2, Extended European Search Report dated Jul. 11, 2018, 19 pages.

* cited by examiner

METHODS AND SYSTEMS FOR VERIFYING USERS BY TELEPHONE NUMBERS

CROSS-REFERENCE TO RELATED APPLICATIONS

The present application claims the benefit of U.S. provisional patent application Ser. No. 62/138,145, filed 25 Mar. 2015, which is incorporated herein by reference.

TECHNICAL FIELD

The present invention relates to a technique for verifying users by telephone numbers.

BACKGROUND

Many services provided on the Internet require users to enter a phone number when signing up for and/or using the service. The phone number may be used by the service, e.g., to identify the user to other users of the service, or to ensure that only one user account is created for each telephone number. For such a service, it is important to verify that the user connecting to the service is an actual person, which corresponds to verifying that the phone number exists, is in use and belongs to the user that connects to the service.

For verifying telephone numbers, two methods are common. The first method is SMS-based verification, in which a service sends a text message (SMS) with a PIN code to a phone number provided by the user, and requests the user to input the PIN code to the service so as to verify that the phone number indeed is connected to the user. The SMS-based verification has the disadvantage of being costly, since sending text messages is associated with a cost. SMS-based verification may also be undesirably slow due to the time it takes for the SMS to reach the user and/or the user to react on the SMS. The second method is call-based verification, in which the service places an automated call using an IVR (Interactive Voice Response) system to a phone number provided by the user. The automated call informs the user of a PIN code and requests the user to input the PIN code to the service. In a variant, the service displays the PIN code, places the automated call to the phone number and requests the user to enter the PIN on the phone. In a further variant, e.g. known from U.S. Pat. No. 8,964,951, the service displays a phone number and requests the user to call this phone number from the phone number to be verified, whereupon the service verifies the user if the service finds that the resulting call originates from the phone number to be verified. The call-based verification techniques have the disadvantage of costing money, since the phone call interaction with the user is associated with a cost. The call-based verification techniques have the further disadvantage of not being automatic since user actions are required.

SUMMARY

It is an objective of the invention to at least partly overcome one or more limitations of the prior art.

In view of the foregoing, one objective is to provide a user-friendly and simple technique for verifying a user by a telephone number.

Another objective is to enable such user verification with a minimum of user intervention.

Yet another objective is to enable such user verification at a low cost for both user and service.

A still further objective is to provide a technique for user verification which is difficult to deceive.

One or more of these objectives, and further objectives that may appear from the description below, are at least partly achieved by means of computer-implemented methods, a computer-implemented verification system on a communication device, a computer-implemented verification server system according to the independent claims, and a method of verifying a user, embodiments thereof being defined by the dependent claims.

A first aspect of the invention is a computer-implemented method performed by a software-controlled communication device associated with a subscription telephone number in a telephone network. The method comprises: operating a monitoring process to detect an incoming verification call and determine an originating telephone number of the incoming verification call, said incoming verification call being initiated at a server system to verify an unconfirmed telephone number by placing the verification call to the unconfirmed telephone number from a calling telephone number; and transmitting, when the monitoring process detects the incoming verification call, a verification request to the server system, the verification request including the originating telephone number of the incoming verification call, thereby allowing the server system to verify that the unconfirmed telephone number is a subscription telephone number assigned to the communication device by comparing the originating telephone number with the calling telephone number.

A second aspect of the invention is a computer-readable medium comprising program instructions that, when executed by a processor in a communication device associated with a subscription telephone number in a telephone network, performs the method of the first aspect.

A third aspect of the invention is a computer-implemented verification system on a communication device which is associated with a subscription telephone number in a telephone network. The verification system comprises: a verification call detector configured to monitor a voice call interface in the communication device for detection of an incoming verification call and determine an originating telephone number of the incoming verification call, said incoming verification call being initiated at a server system to verify an unconfirmed telephone number by placing the verification call to the unconfirmed telephone number from a calling telephone number; and a request handler configured to generate, when the incoming verification call is detected, a verification request including the originating telephone number of the incoming verification call, and transmit the verification request to the server system, thereby allowing the server system to verify that the unconfirmed telephone number is a subscription telephone number assigned to the communication device by comparing the originating telephone number with the calling telephone number.

A fourth aspect of the invention is a computer-implemented method performed by a software-controlled communication device associated with a subscription telephone number in a telephone network. The method comprises: operating a monitoring process to detect an incoming verification call and determine an identifier transmitted by the incoming verification call, said incoming verification call being initiated at a server system to verify an unconfirmed telephone number by placing the verification call to the unconfirmed telephone number; and transmitting, when the monitoring process detects the incoming verification call, a verification request to the server system, the verification request including the identifier, thereby allowing the server system to verify that the unconfirmed telephone number is a subscription telephone number assigned to the communication device by validating the identifier.

A fifth aspect of the invention is a computer-implemented method in a software-controlled server system connected to a data network, said server system providing a verification service. The method comprises: initiating a verification call from a telephone network to an unconfirmed telephone number from a calling telephone number; waiting for a verification request via the data network, said verification request including an originating telephone number of the verification call as determined by a communication device associated with the unconfirmed telephone number; and validating the unconfirmed telephone number by comparing the originating telephone number with the calling telephone number.

A sixth aspect of the invention is a computer-readable medium comprising program instructions that, when executed by a processor in a server system connected to a data network, performs the method of the fourth aspect.

A seventh aspect of the invention is a computer-implemented verification server system connected to a data network by a data communication interface. The verification server system comprises: a call initiation module configured to initiate a verification call to an unconfirmed telephone number from a calling telephone number; and a request handler configured to receive via the data communication interface a verification request including an originating telephone number of the verification call as determined by a communication device associated with the unconfirmed telephone number; wherein the request handler is further configured, when receiving the verification request, to validate the initial request by comparing the originating telephone number with the calling telephone number.

An eighth aspect of the invention is a computer-implemented method in a software-controlled server system connected to a data network, the server system providing a verification service. The method comprises: initiating a verification call to an unconfirmed telephone number, so as to transmit an identifier by the verification call; waiting for a verification request via the data network, said verification request including an identifier value as determined by a communication device based on the verification call; and validating the unconfirmed telephone number by comparing the identifier value with the identifier.

A ninth aspect of the invention is a method of verifying a user. The method comprises: allowing the user to initiate a request for verification of an unconfirmed telephone number at a server system, so as to cause the server system to initiate a verification call from a telephone network to the unconfirmed telephone number from a calling telephone number; and providing, to the user, a computer program for installation in a communication device, said computer program being operable to: detect an incoming verification call and determine an originating telephone number of the incoming verification call; and transmit, when the monitoring process detects the incoming verification call, a verification request to the server system, the verification request including the originating telephone number of the incoming verification call, thereby allowing the server system to verify that the unconfirmed telephone number is a subscription telephone number assigned to the communication device by comparing the originating telephone number with the calling telephone number.

Any one of the embodiments of the first aspect as defined herein may be adapted and implemented as an embodiment of the second to fourth aspects. Similarly, any one of the embodiments of the fifth aspect as defined herein may be adapted and implemented as an embodiment of the sixth to eighth aspects.

Still other objectives, features, aspects and advantages of the present invention will appear from the following detailed description, from the attached claims as well as from the drawings.

BRIEF DESCRIPTION OF THE DRAWINGS

Embodiments of the invention will now be described herein by way of example only, with reference to the accompanying schematic drawings.

DETAILED DESCRIPTION OF EXEMPLARY EMBODIMENTS

Figure 1:
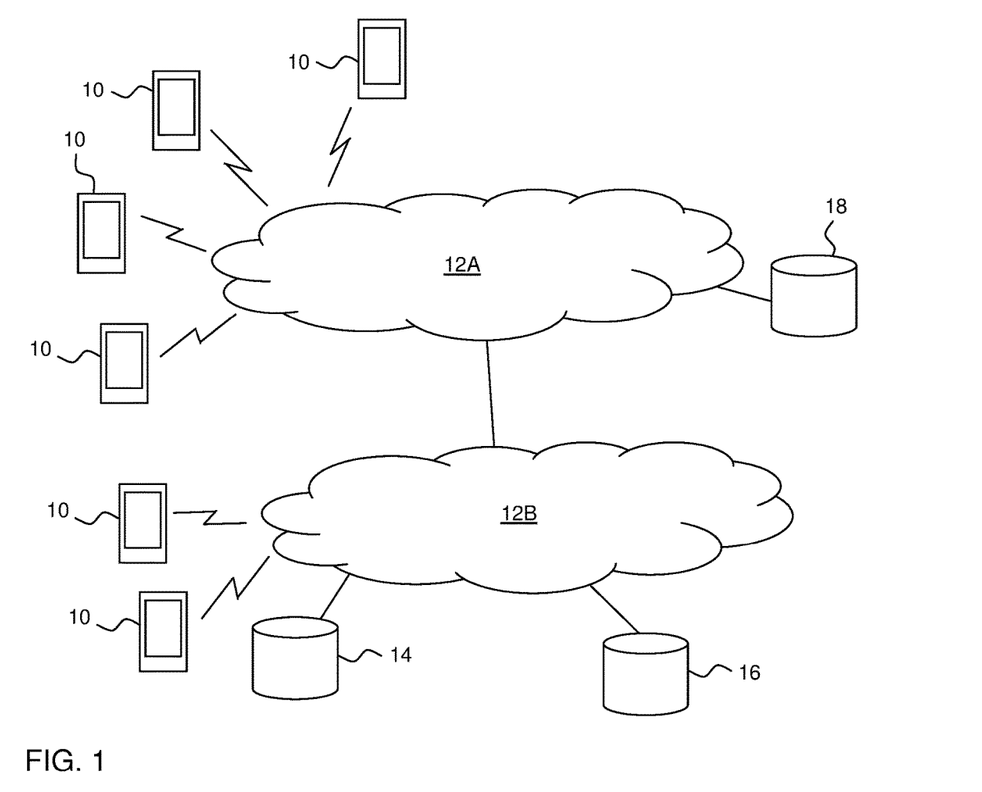
FIG. 1 is a block diagram of a network environment involving a number of mobile terminals and server systems.

Embodiments of the invention will be described with reference to the example network environment shown in FIG. 1. A plurality of terminals 10 are configured for connection to a telephone network 12A. The terminal 10 may be any type of network communication device that is associated with a subscription telephone number in the telephone network 12A. This type of terminal includes mobile devices such as mobile phones and tablet computers, as well as computers comprising equipment such as a modem for access to the telephone network 12A. The terminals 10 also access a data network 12B via their connection to the telephone network 12A. As shown in FIG. 1, the terminals 10 may also connect directly to the data network 12B, instead of or in addition to, the telephone network 12A.

The data network 12B may be any type of network that allows the terminal 10 to communicate with one or more servers or server systems 14, 16, typically located in a wide area network (WAN) such as the Internet. However, it is also conceivable that one or more of the servers 14, 16 is located in a private area network (PAN) or a local area network (LAN). Each server 14, 16 is a running instance of an application (software) capable of accepting requests from a client and giving responses accordingly. Each server 14, 16 may be run on any computer or combination of computers and provide one or more services.

The terminals 10 may be wirelessly connected to the telephone network 12A, e.g. by radio link to a base station or gateway of a cellular network. Likewise, the terminals 10 may be wirelessly connected to the data network 12B, e.g. by radio link to a wireless access point, such as an IIIE 802.11 access device. Alternatively, the terminals 10 may be connected by wire to the respective network 12A, 12B.

Terminals 10 for use in cellular telephone networks securely store an international mobile subscriber identity (IMSI) which is used to identify the user and is directly or indirectly associated with a subscription telephone number in the telephone network 12A. IMSI is stored as a 64 bit field and may be sent by the terminal 10 to the network 12A. For GSM, UMTS and LTE networks, IMSI is provisioned in a Subscriber Identity Module (SIM) which is installed in the terminal. For CDMA2000 networks, IMSI is provisioned in the terminal directly or in a Removable User Identity Module (R-UIM), which is analogous to a SIM. The module storing the IMSI may also be denoted Universal Integrated Circuit Card (UICC) or CDMA Subscriber Identity Module (CSIM). For security reasons, the IMSI is sent as rarely as possible and a randomly generated Temporary Mobile Subscriber Identity (TMSI) is sent instead. TMSI is randomly assigned by the network to every mobile device the moment it is switched on. Irrespective of telephone network 12A, each terminal 10 is uniquely associated with a subscription telephone number in the telephone network 12A. The telephone network 12A is commonly referred to as the public switched telephone network (PSTN), which represents the aggregate of the world's telephone networks that are operated by national, regional, or local telephone operators, providing infrastructure and services for public telecommunication, including both landline telephone networks and cellular telephone networks.

The terminals 10 may be capable of connecting to one or both networks 12A, 12B to establish voice and data communications. The data communications may relate to communication services such as text messaging (e.g. SMS), email messaging, real-time messaging, voice messaging, VoIP (voice over IP) etc, as well as retrieving electronic documents and/or streams, such as web pages, photographs, videos etc.

In FIG. 1, the telephone network 12A includes at least one PSTN server 18 which is operable to place a voice call to a specified subscription telephone number over the public switched telephone network 12A. The PSTN server 18 may be commanded to place a voice call to the specified subscription number from a specified caller number ("calling telephone number") through a standardized API. The operation of the PSTN server 18 is well-known to the skilled person and will not be described in further detail.

The terminals 10 are capable of running software programs, which may be pre-installed in the terminal 10 or installed by the user of the terminal, e.g. downloaded from a server in the network. In the following, these software programs are denoted "application programs". At least one of these application programs implements a verification process and is denoted "verification application" in the following.

The verification application may be a generic verification program, which is executed on the terminal 10 to generically verify a user of the terminal 10 to a plurality of services on the network 12B, and in particular to verify that a particular telephone number indeed is associated with the user of the terminal 10. Such a generic verification application may be a trusted application on the terminal 10 that verifies the telephone number to other application programs on the terminal 10. For example, the generic verification application may be run on command by other application programs on the terminal 10 to verify the telephone number. Alternatively, the verification application may be designed to enable access from the terminal 10 to a specific service or group of services provided by a server on the network 12B, e.g. as part of a registration or log-in procedure between the terminal 10 and the server.

The verification process on the terminal 10 is executed in communication with a verification server, designated by 14 in FIG. 1. As understood from the foregoing, the verification server 14 may be exclusively configured to provide a verification service that verifies the telephone number. Alternatively, the verification server 14 may execute the verification service as part of or in conjunction with another service.

Typically, the terminal 10 communicates directly with the verification server 14 using a common protocol. Specifically, the communication between the terminal 10 and the verification server 14 may involve transmitting remote calls or "requests" that are interpreted at the receiver. The requests may convey a value of a certain parameter or initiate an action at the receiver.

Figure 2:
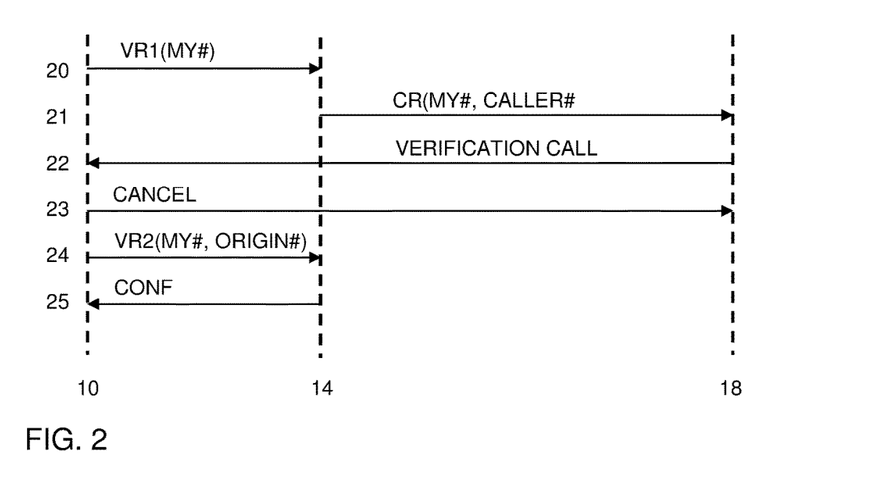
FIG. 2 is a node sequence diagram for a verification process executed in the network environment of FIG. 1.

FIG. 2 shows an embodiment of a verification process executed in the network environment of FIG. 1 to verify that an unconfirmed telephone number, which is entered through the terminal 10, corresponds to an actual subscription telephone number and that this subscription telephone number is associated with the terminal 10. As explained in the foregoing, the verification process is performed by a verification application executed on the terminal 10 and a verification service executed on the verification server 14. Basically, the verification process involves setting up a unique call from a PSTN server 18 to the unconfirmed telephone number, and checking if the call is received by the terminal 10. If the call is received, the verification server 14 concludes that the unconfirmed telephone number is a subscription telephone number associated with the terminal 10. The verification process is particularly, but not exclusively, useful for verifying mobile telephone numbers.

In the example of FIG. 2, the terminal 10 sends a first or initial verification request VR1 to the verification server 14 (step 20). The request VR1 includes an unconfirmed telephone number, designated by MY#. Upon receiving VR1, the verification server 14 sends a call request CR to the PSTN server 18 (step 21). The call request CR includes MY# and a selected calling telephone number, designated by CALLER#. CALLER# is selected by the server 14. The call request CR causes the PSTN server 18 to place a verification call to MY# from CALLER# (step 22). The terminal 10 cancels the verification call after having determined the originating telephone number of the incoming call, designated by ORIGIN# (step 23). The terminal 10 then sends a second verification request VR2 to the server 14. The request VR2 includes MY# and ORIGIN# (step 24). The server 14 compares ORIGIN# to CALLER#. If they match, the verification is deemed successful, otherwise the verification is deemed to fail. The server 14 may also send a confirmation message CONF to the terminal 10 indicating if the verification was successful or not (step 25).

The verification process may provide access to a service in different ways. In one variant, the server 14 gives the verification application on the terminal 10 access to another service on the server 14 or on another server connected to the network 12B, when the server finds that ORIGIN# matches CALLER#. In another variant, the verification application on the terminal 10 gives another application program on the terminal 10 access to a service on the server 14 or on another server connected to the network 12B, when the verification application receives the confirmation message CONF.

The verification process in FIG. 2 may be performed automatically, without requiring any user intervention via the terminal 10. It may also be hidden to the user, i.e. the steps 20-25 may be executed without the user being informed about the respective steps or the verification call. Furthermore, the verification process may be performed without incurring any cost for the user or the provider of the verification service, e.g. by terminating the verification call without answering. Still further, it is difficult for the user to deceive the verification process, since the actual verification is made remote from the terminal 10, on the server-side. The user cannot manipulate the verification call, which is generated under control of the server 14 and is placed from the PSTN server 18. Conventional measures may be taken to prevent user access to the verification application on the terminal 10, which executes the verification process on the terminal-side.

The verification process may be used whenever there is a need to verify a telephone number, and to thereby indirectly verify a user to a service. A few examples are given below.

Many providers of application programs and associated services have an incentive to acquire a large user base. To attract new users, the provider may offer free items in return for a user registration. For example, a provider of a VoIP service may give the user free calls, free call time credits, free text messages, a free month of usage, etc. This may provide an incentive for a user to register multiple times with the same service, to gain access to more free items. To prevent this, the provider may implement the inventive verification process as part of the registration procedure and require the user to enter a subscription telephone number. The user is only granted access to the service, and to the free items, if the entered subscription telephone number is verified by the verification process.

A service that allows a user to make an outgoing telephone call or send a text message through an application program or a web page on the terminal 10 may need to present the caller/sender to the recipient of the call/text message. In the absence of verification, a user may enter an incorrect phone number as caller/sender. The service provider may implement the inventive verification process as part of a registration procedure, a log-in procedure, or whenever a user wants to make an outgoing call or send a text message through the service, to ensure that the telephone number entered by the user is validly associated with the user.

Many services use a telephone number of a user for finding other users. One such example is Viber, which is an instant messaging and VoIP application program. Upon installation on the terminal, the VoIP application program creates a user account with a phone number as username. The service synchronizes with the address book in the terminal. Since all users are registered by their phone number, the service returns to the terminal information about all Viber users among the contacts in the address book. In such a service, it may be vital that the phone numbers provided to the service are verified. The inventive verification process may be implemented as part of the installation process to ensure that the entered phone number is validly associated with the user.

As another example, a dating service may require its users to enter a telephone number when registering for the service. To prevent that a user registers a fake telephone number for total anonymity, the dating service may implement the inventive verification process as part of the registration procedure, or at a later stage, to verify that the telephone number entered by the user is a subscription telephone number validly associated with the user.

Figure 3:
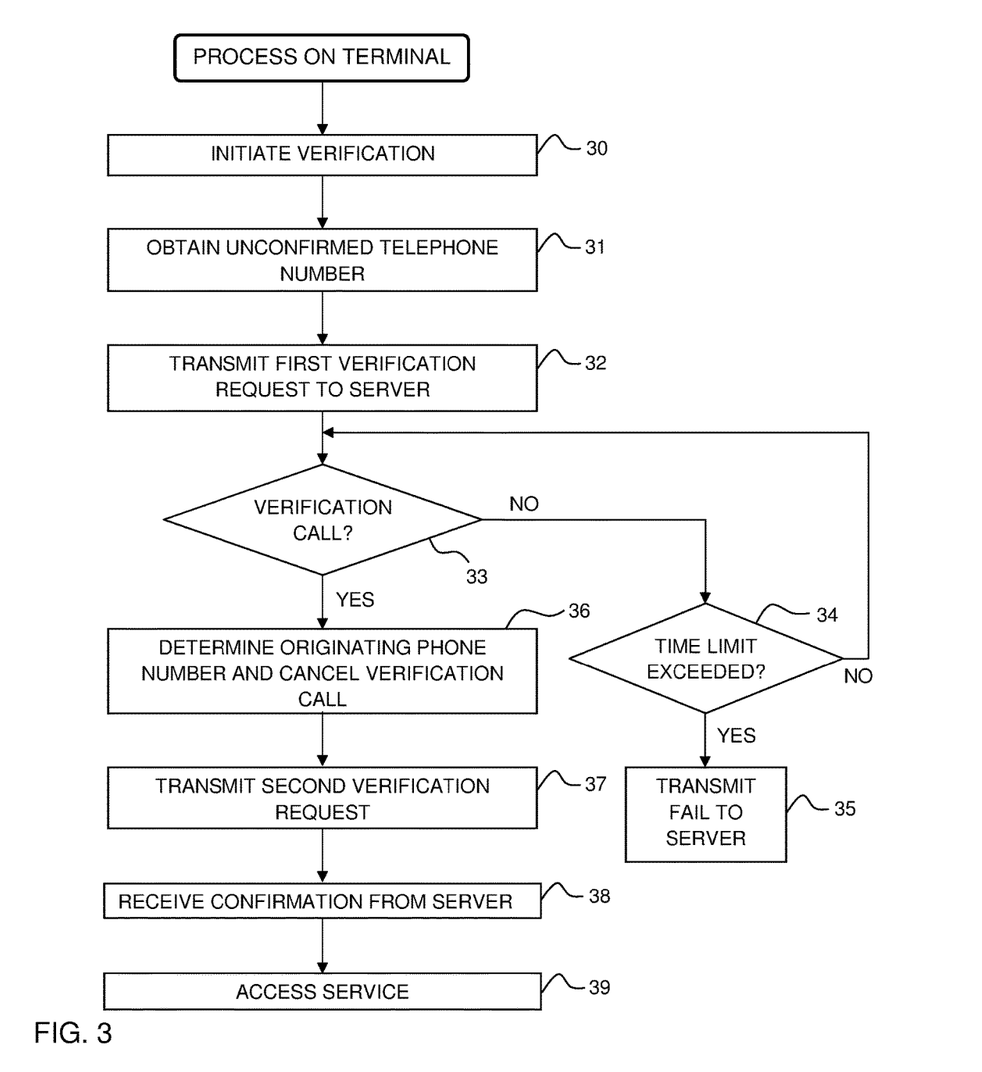
FIG. 3 is a flowchart of a terminal-side verification process executed by one of the terminals in FIG. 1.

FIG. 3 is a flow chart illustrating an embodiment of the terminal-side of the verification process in FIG. 2. In step 30, the verification process is initiated, e.g. by a user of the terminal 10, by another application program on the terminal, or by a service on a server to which the terminal 10 has connected. Thus, the verification process may be initiated on request by the user or automatically. In step 31, an unconfirmed telephone number (MY#) is obtained. The unconfirmed telephone number may be entered manually by the user, retrieved from a phone book on the terminal 10, provided for verification by another application program on the terminal 10 or by a service via a web page on the terminal 10. In step 32 (corresponding to step 20 in FIG. 2), the first verification request (VR1) with the unconfirmed telephone number is transmitted to the verification server 14. At the same time, the process may ensure that CID (caller identification) blocking is turned off on the terminal 10. Then, in steps 33-34, the process waits for the verification call. Step 33 may start a monitoring process on the terminal, if not already started, to monitor or intercept all incoming calls. This monitoring process may be implemented by dedicated intercept software included in or used by the verification application on the terminal 10. The verification call may be identified by the monitoring process in different ways. In one alternative, the first incoming call after step 32 is identified as the verification call. In another alternative, if the verification call is known to belong to a certain group of telephone numbers, step 33 will identify the verification call as the first incoming call that originates from a telephone number that matches this group of telephone numbers. The group of telephone numbers may e.g. be stored in any format in the memory of the terminal 10. If no verification call is received within a given time limit (step 34), a fail message is transmitted to the server 14 to indicate that the verification failed (step 35). If the verification call is received (corresponding to step 22 in FIG. 2), the originating phone number (ORIGIN#) of the verification call is determined (step 36), if not already determined during steps 33-34. The originating phone number may be obtained as the CID for the incoming call. The CID represents the caller's number and is transmitted during the ringing signal, or when the call is being set up but before the call is answered. Thus, the originating phone number for a call can be retrieved without answering the call. After retrieving the originating phone number, the verification call is canceled, e.g. by terminating the call or by presenting a busy signal to the caller. In step 37 (corresponding to step 24 in FIG. 2), the second verification request (VR2) is transmitted to the server 14 with the unconfirmed telephone number and the originating phone number. If the terminal 10 receives a confirmation from the server 14 indicating that the verification has succeeded (step 38), the terminal 10 may e.g. proceed to access a particular service (step 39).

Figure 4:
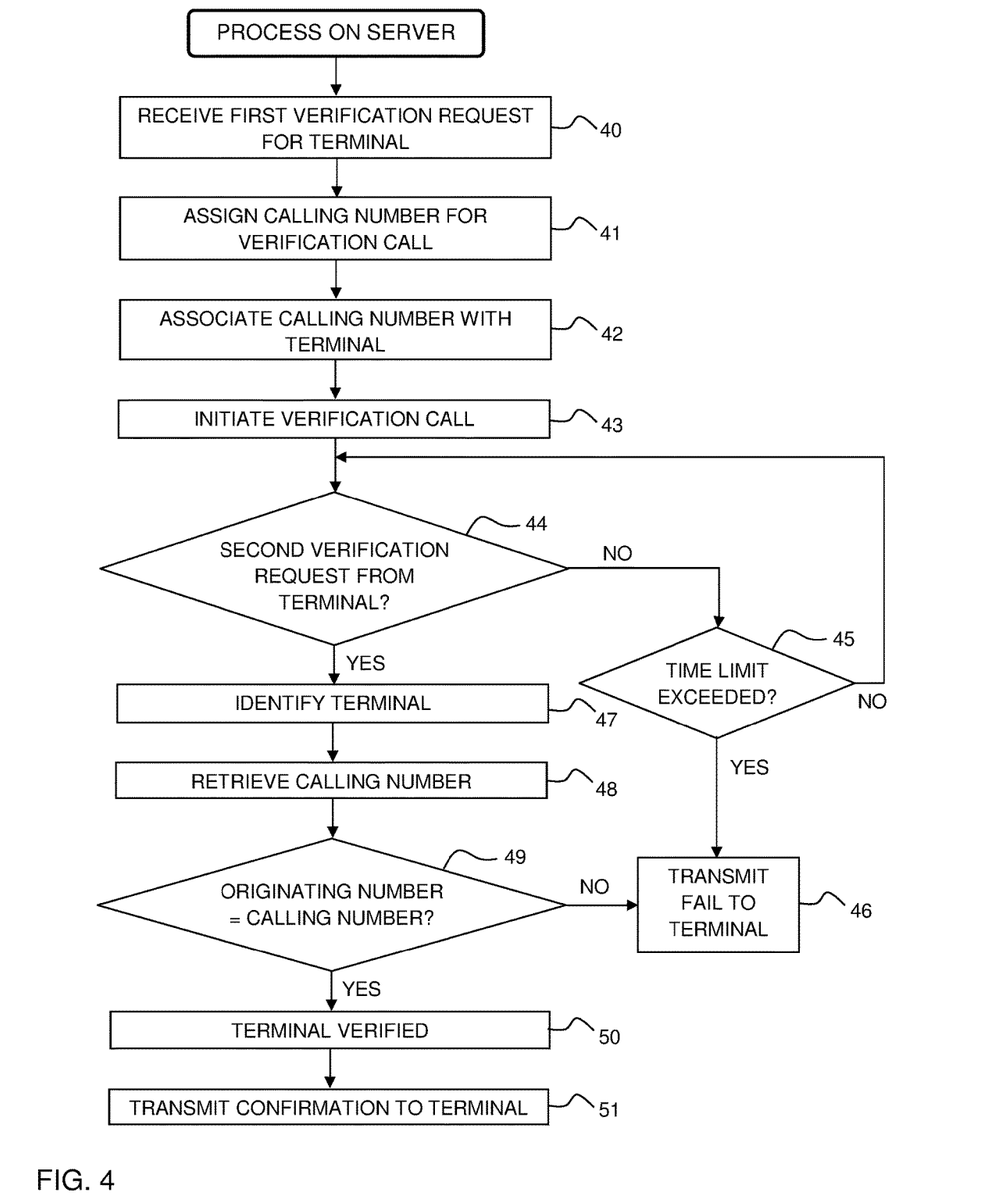
FIG. 4 is a flowchart of a server-side verification process executed by a verification server in FIG. 1.

FIG. 4 is a flow chart illustrating an embodiment of the server-side of the verification process in FIG. 2. In step 40 (corresponding to step 20 in FIG. 2), the first verification request (VR1) is received, causing the server 14 to assign a calling number (CALLER#) for the verification call (step 41). The calling number is typically selected from a pool of telephone numbers that have been acquired for use by the verification service. Information about available calling numbers may be stored in a memory of the server 14. In step 42, an association between the calling number and the terminal (e.g., the unconfirmed telephone number) is stored in the memory. In step 43 (corresponding to step 21 in FIG. 2), the verification call is initiated by transmitting the call request (CR) to the PSTN server 18. Then, in steps 44-45 (corresponding to step 24 in FIG. 2), the process waits for the second verification request (VR2). If the second verification request is not received within a given time limit (step 45), the verification is deemed to fail and a corresponding confirmation (CONF) is transmitted to the terminal (step 46). If the second verification request is received, the terminal is identified (step 47), e.g. by the unconfirmed telephone number (MY#) included in the second verification request, and the calling number corresponding to the terminal is retrieved from the memory of the server (step 48). In step 49, the originating phone number (ORIGIN#) included in the second verification request is compared to the calling number retrieved in step 48. If they match, the verification is deemed to succeed, otherwise the verification is deemed to fail (step 50). A corresponding confirmation (CONF) is transmitted to the terminal (step 46).

The verification process in FIG. 2 may be modified in many different ways without departing from the underlying concept of the present invention. A few alternative embodiments will be briefly discussed with reference to FIGS. 5A-5D, with focus on differences compared to FIG. 2.

Figure 5A:
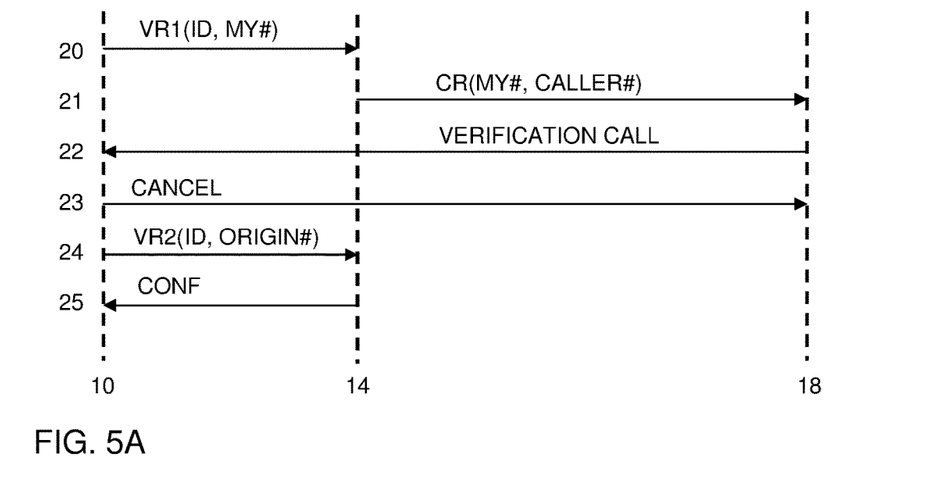
FIGS. 5A-5D are node sequence diagrams for alternative embodiments of the verification process of FIG. 2.

In FIG. 5A, step 20 is modified to include a unique terminal identifier ID in the first verification request VR1. The terminal identifier may be predefined and stored in a memory of the terminal 10, or it may be dynamically assigned by or for the terminal 10 prior to generating the first verification request VR1. The terminal identifier is used by the verification server 14 in step 21 to associate the calling number CALLER# with the terminal 10. Consequently, step 24 is also modified by including the terminal identifier ID in the second verification request VR2 instead of the unconfirmed telephone number MY#.

Figure 5B:
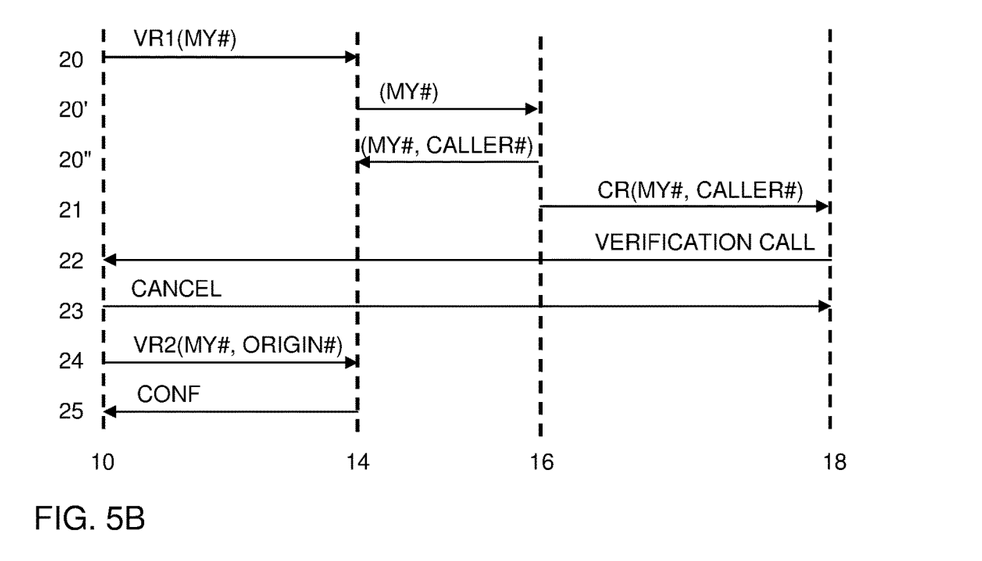

In FIG. 5B, the terminal-side is identical to FIG. 2 whereas the server-side differs in that the verification server 14 has delegated the generation of the call request CR to another server 16. Nevertheless, the verification call is initiated by the verification server 14 in step 20'. In step 20', the verification server 14 transmits a specific request (including the unconfirmed telephone number MY#) to the server 16 that causes the server 16 to independently assign a calling number CALLER# and generate and transmit the call request CR. In step 20", the server 16 informs the verification server 14 about the calling number CALLER# assigned to the unconfirmed telephone number MY#.

Figure 5C:
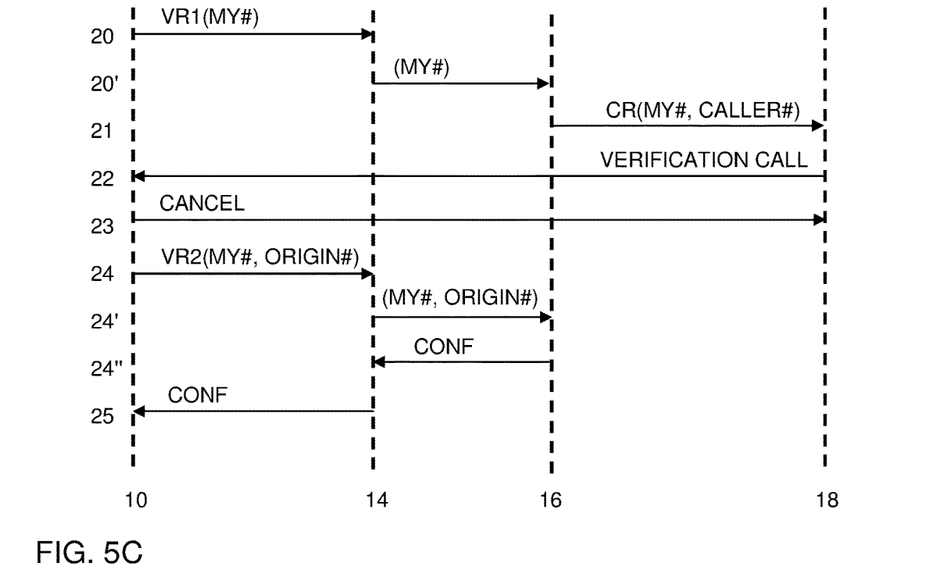

In FIG. 5C, the terminal-side is also identical to FIG. 2 whereas the server-side differs in that the verification server 14 has delegated both the generation of the call request CR and the comparing of CALLER# to ORIGIN# to another server 16. In step 20', the verification server 14 transmits a specific request (including the unconfirmed telephone number MY#) to the server 16 that causes the server 16 to independently assign a calling number CALLER# and generate and transmit the call request CR. In contrast to FIG. 5B, the server 16 does not return CALLER# to the verification server 14, but stores an association MY#:CALLER#. In step 24', when the verification server 14 has received the second verification request VR2 from the terminal 10, the verification server 14 sends a specific request (including MY# and ORIGIN#) to the server 16 that causes the server 16 to retrieve CALLER# associated with MY# and compare ORIGIN# to the retrieved CALLER#. In step 24", the server 16 returns a confirmation CONF to the verification server indicating whether there is a match or not. It is understood that the verification server 14, by step 24', controls the process in the server 16 and thus indirectly performs the step of comparing ORIGIN# to CALLER#.

Figure 5D:
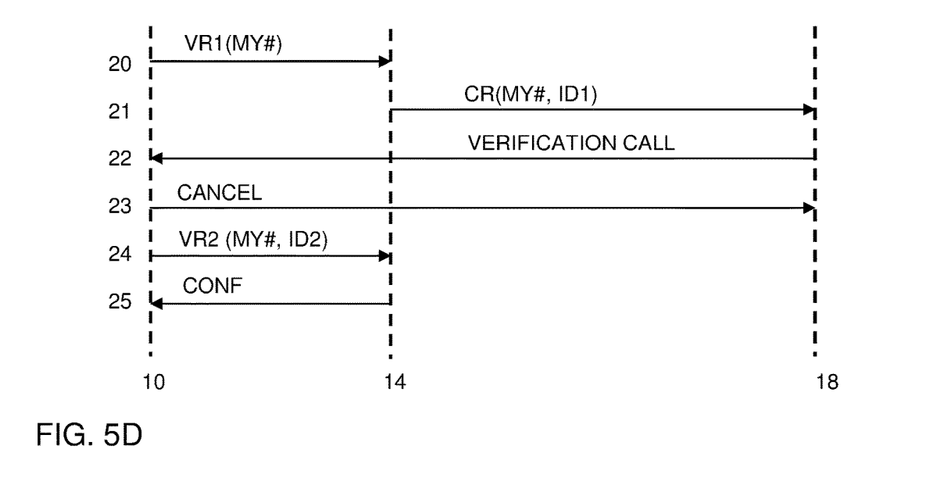

FIG. 5D illustrates a generalization of the verification process in FIG. 2, which does not require the verification server 14 to base the verification on a comparison of CALLER# and ORIGIN#. Instead, in step 21, the verification server 14 initiates/generates the call request CR to include the unconfirmed telephone number MY# and an identifier ID1. The identifier is generated by or for the verification server 14 and is associated with the terminal 10 (e.g. by MY#). If required by the PSTN server 18, the call request CR may also include a calling number CALLER#. However, in contrast to the process in FIG. 2, CALLER# need not be unique. The call request CR causes the PSTN server 18 to include ID1 in the verification call to MY#. In current PSTN networks, it is not possible to include an arbitrary identifier in a voice call so that the identifier can be intercepted without answering the voice call. In one embodiment, the call request CR is therefore configured to cause the PSTN server 18 to encode the first identifier ID1 as signals (sounds) transmitted by the voice call, e.g. using DTMF (Dual-tone multi-frequency signaling). When the verification call is intercepted by the terminal-side process, in step 22, the verification call is answered and the encoded signals are decoded into a received identifier value, designated by ID2 in FIG. 5D. The verification call is then cancelled in step 23, whereupon the identifier value ID2 is sent to the verification server 14 together with MY# in the second verification request VR2 (step 24). The verification server 14 then verifies the user by validating the received identifier value ID2, e.g. by retrieving the first identifier ID1 (based on MY#) and comparing ID2 to ID1. Like all other verification processes disclosed herein, the terminal-side process in FIG. 5D may performed automatically and hidden to the user of the terminal 10.

It should be understood that the flow charts in FIGS. 3-4 are also relevant for the embodiments in FIGS. 5A-5D and FIGS. 8A-8B (see below) with modifications that should be evident to the skilled person based on the teachings presented herein and will not be discussed in further detail.

Figure 6:
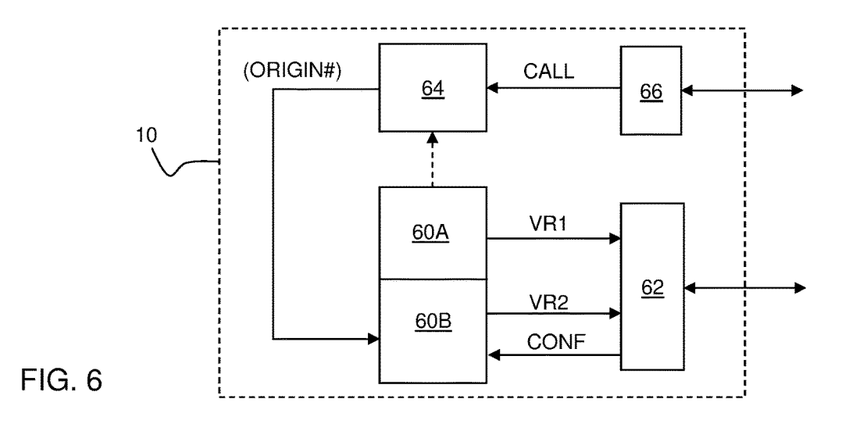
FIG. 6 is a block diagram of functional blocks of a terminal for implementation of the verification process of FIG. 3.

FIG. 6 is a block diagram of the terminal 10 illustrating functional blocks that are used or instantiated during execution of the verification process as presented in FIGS. 2-4. It is to be understood that the respective block may be implemented by hardware and/or software. For example, blocks 60A, 60B and 64 may be implemented by software, e.g. an application program, and blocks 62 and 66 may exist on the terminal 10 independent of the application program and may be implemented by hardware and/or software.

In FIG. 6, the terminal 10 includes a first request handler 60A which implements steps 30-32 in FIG. 3. The handler 60A is operable to connect to a data communication interface 62 for transmission of the first verification request VR1 to the server (not shown). A verification call detector or intercept module 64 implements steps 33-36 in FIG. 3. The detector 64 is operable to connect to a voice call interface 66 for interception and detection of the verification call. As indicated by a dashed arrow, the handler 60A is operable to directly or indirectly initiate the detector 64 to start monitoring incoming calls on the interface 66. The terminal 10 further includes a second request handler 60B which implements steps 37-38 in FIG. 3. The handler 60B is thus operable to obtain the originating telephone number ORIGIN# determined by the detector 64. The handler 60B is further operable to connect to the interface 62 for transmission of the second verification request VR2 to the server (not shown).

Figure 7:
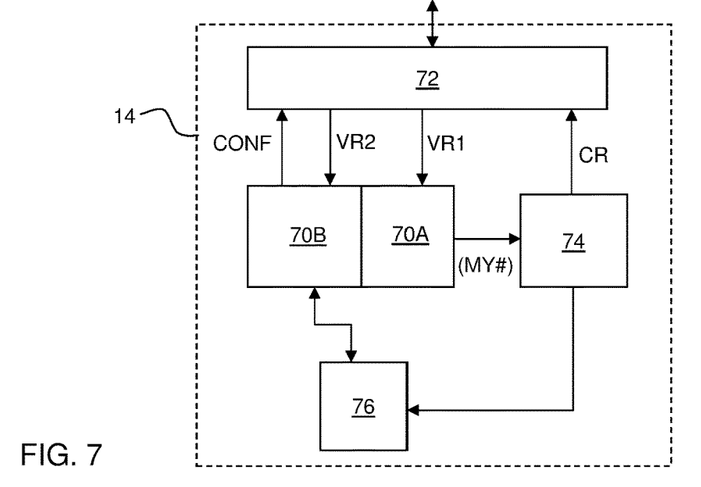
FIG. 7 is a block diagram of functional blocks of a server system for implementation of the verification process of FIG. 4.

FIG. 7 is a block diagram of the verification server 14 illustrating functional blocks that are used or instantiated during execution of the verification process as presented in FIGS. 2-4. Like in FIG. 6, the respective block may be implemented by hardware and/or software. For example, blocks 70A, 70B and 74 may be implemented by software, e.g. a server program, and blocks 72 and 76 may exist on the server 14 independent of the server program and may be implemented by hardware and/or software.

In FIG. 7, the server 14 includes a first request handler 70A which implements step 40 in FIG. 4. The handler 70A is operable to connect to a data communication interface 72 for receiving the first verification request VR1 from the terminal (not shown). A call initiation module 74 implements steps 41-43 in FIG. 4. The module 74 is operable to receive the unconfirmed telephone number MY# determined by the handler 70A. The module 74 is further operable to connect to the interface 72 for initiation of the verification call, e.g. by transmitting the call request CR to the PSTN server 18. The module 74 is further operable to connect to a memory 76 for storage of the calling number CALLER#, e.g. in association with MY#. The server 14 further includes a second request handler 70B which implements steps 44-51 in FIG. 4. The handler 70B is thus operable to connect to the interface 72 for receiving the second verification request VR2 from the terminal (not shown). The handler 70B is further operable to connect to the memory 76 for retrieving the originating telephone number ORIGIN#, e.g. based on MY# included in VR2, and to compare CALLER# in VR2 to ORIGIN# for verification.

It should be understood that the block diagrams in FIGS. 6-7 are also relevant for the embodiments in FIGS. 5A-5D and FIGS. 8A-8B (see below) with modifications that should be evident to the skilled person based on the teachings presented herein and will not be discussed in further detail.

Reverting to the embodiment in FIGS. 2-3, it should be noted that the verification process need not be initiated (step 30) via the terminal 10 that is associated with the unconfirmed telephone number. Likewise, the first verification request VR1 need not be generated and transmitted from this terminal 10 (steps 31-32). In fact, steps 30-32 may be executed by any communication device which is capable of connecting to the telephone or data network 12A, 12B (FIG. 1), as further exemplified below with reference to FIGS. 8A-8B.

Figure 8A:
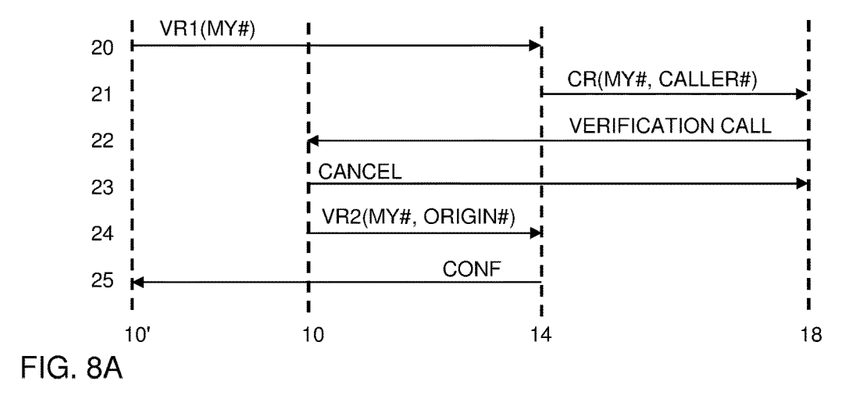
FIGS. 8A-8B are node sequence diagrams for further alternative embodiments of the verification process of FIG. 2.

In the embodiment of FIG. 8A, the request VR1 is generated by and transmitted to the server 14 from a communication device 10' other than the terminal 10 (step 20). The device 10' may be a computer, a server, a mobile terminal, etc. For example, the request VR1 may be generated and transmitted when a user accesses a network service, e.g. via a web browser on a computer/terminal. The request VR1 may be generated by and transmitted to the server 14 from the computer/terminal that is operated by the user to access the network service, or from the network service itself. Thus, the request VR1 may in fact be provided as an internal command on the server 14, e.g. if the network service accessed by the user is the verification service itself. It should also be noted that the request VR1, in all embodiments and variants disclosed herein, may be either explicit or implicit. Such an explicit request VR1 may contain the unconfirmed telephone number MY# to be verified, whereas an implicit request VR1 may neither be formatted as a request or command, nor include MY#. For example, the implicit request VR1 may be a simple trigger signal that the server 14 is able to associate with a specific telephone number to be verified. The server-side in FIG. 8A is identical to FIG. 2 and will not be further described. In the example of FIG. 8A, the server 14 sends the confirmation message CONF to the device 10', although CONF may be sent to the terminal 10 or to any other device, e.g. the network service that is accessed by the user. Although not shown in FIG. 8A, the server 14 may be configured, as part of step 21, to transmit a message to the device 10' or the terminal 10 prompting the user to start the verification process on the terminal 10, e.g. by activating the verification application on the terminal 10.

Figure 8B:
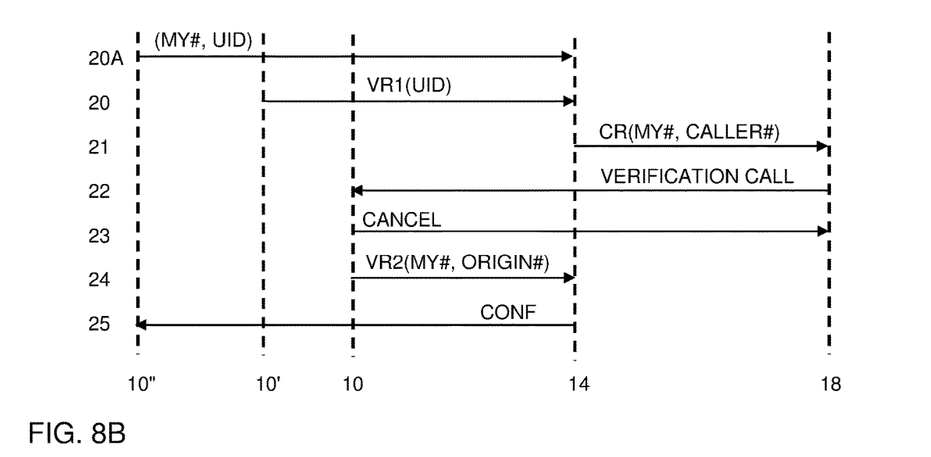

Compared to FIG. 8A, the embodiment in FIG. 8B involves yet another communication device 10", which may be a computer, a server, a mobile terminal, etc. The device 10" is used in step 20A to provide the unconfirmed telephone number MY# to the server 14, together with user identification data (UID). The UID identifies the user and is associated with MY# at the server 14. Step 20A may e.g. be performed when the user registers for a service, and the UID may include one or more of a name, a postal address, an email address, a birth date, etc. In step 20, the request VR1 is generated and transmitted from the communication device 10', e.g. as described in relation to FIG. 8A. However, in the illustrated example, the request VR1 does not include MY# but UID. Upon receipt of VR1, the server 14 identifies MY# based on UID and includes MY# in the call request CR to the PSTN server 18. The subsequent steps 22-25 are identical to FIG. 2 and will not be repeated.

Figure 9:
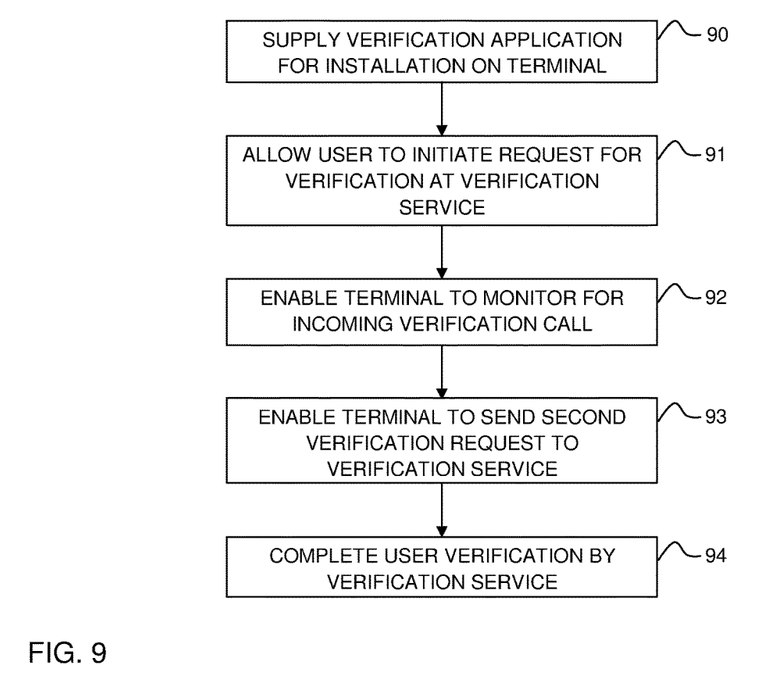
FIG. 9 is a flow chart of steps performed by a verification provider in relation to a user.

FIG. 9 is a flow chart of steps performed by a verification provider in relation to a user. In step 90, the verification provider supplies a verification application for installation on the terminal 10, the verification application being configured to implement the verification process on the terminal-side. The verification application may be supplied as part of the operating system on the terminal 10, or as a software program for selective installation on the terminal 10, e.g. by download. In step 91, the provider allows the user to initiate a request for verification at the verification service. This may e.g. be done via the verification application on the terminal 10 or by providing a web page for access by the user via the terminal 10 or another communication device 10'. The user may explicitly command the verification, or the verification may proceed automatically based on some user activity. By supplying the verification application for installation on the terminal 10, the provider may be seen to enable terminals 10 to perform the verification process, which involves waiting for and detecting the verification call from the verification service (step 92) and sending the second verification request VR2 to the verification service (step 93). In step 94, the user verification is completed by the verification service on the server 14.

Figure 10:
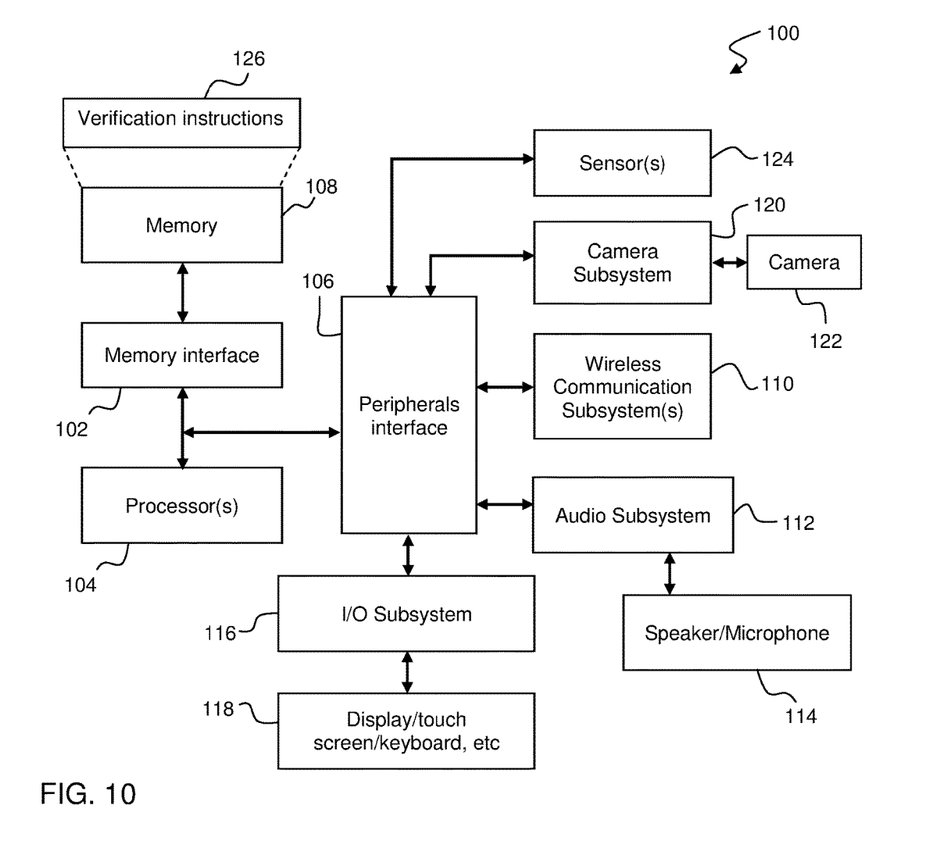
FIG. 10 is a block diagram of an example architecture for the respective terminal in FIG. 1.

FIG. 10 is a block diagram of an example architecture 100 of the terminals 10 in FIG. 1. The terminal 10 may include a memory interface 102, one or more processors 104 such as data processors, image processors and/or central processing units, and a peripherals interface 106. The memory interface 102, one or more processors 104 and/or peripherals interface 106 may be separate components or integrated in one or more integrated circuits. The various components in the terminal 10 may be coupled by one or more communication buses or signal lines. Sensors, devices, and subsystems may be coupled to the peripherals interface 106 to facilitate multiple functionalities.

Communication functions may be facilitated through one or more wireless communication subsystems 110, which can include radio frequency receivers and transmitters and/or optical (e.g., infrared) receivers and transmitters. The specific design and implementation of the communication subsystem 110 may depend on the communication network(s) over which the terminal 10 is intended to operate. For example, the terminal 10 may include communication subsystems 110 designed to operate over networks according to any cellular network protocol, such as GMS, GPRS, EDGE, UMTS, CDM and LTE, as well as other networks such as WiFi, WiMax and Bluetooth™.

An audio subsystem 112 may be coupled to audio hardware component(s) 114, such as a speaker and a microphone, to facilitate voice-enabled functions, such as voice recognition, voice replication, digital recording, and telephony functions, as well as to enable presentation of recorded audio files.

An I/O subsystem 116 may include one or more input/output controllers coupled to input/output hardware component(s) 118, including but not limited to one or more of a touch screen, a display, a keyboard, a touch pad, one or more buttons, rocker switches, a thumb-wheel, an infrared port, a USB port, and a pointer device such as a stylus.

In the specific example of FIG. 8, a camera subsystem 120 with a camera 122 is connected to the peripherals interface 106 to facilitate camera functions, such as recording photographs and video clips. Furthermore, one or more auxiliary sensors 124 such as a motion sensor, orientation sensor, proximity sensor, positioning system (e.g., GPS receiver), temperature sensor, biometric sensor, magnetometer, etc, are coupled to the peripherals interface 106 to facilitate related functionalities.

The memory interface 102 may be coupled to a memory 108. The memory 108 may include high-speed random access memory and/or non-volatile memory, such as one or more magnetic disk storage devices, one or more optical storage devices, and/or flash memory (e.g., NAND, NOR). The memory 108 may store an operating system, such as Android, OS X, Windows Mobile, Darwin, RTXC, LINUX, UNIX, or an embedded operating system such as VxWorks. The operating system may include instructions for handling basic system services and for performing hardware dependent tasks. In some implementations, the operating system may include instructions for performing a verification in relation to a server system providing a service on the data network. For example, the operating system may implement the terminal-side verification process as described with reference to FIGS. 1-9.

The memory 108 may also store communication instructions to facilitate communicating with one or more additional devices, one or more computers and/or one or more servers. The memory 108 may include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GPS/Navigation instructions to facilitate GPS and navigation-related processes and instructions; and camera instructions to facilitate camera-related processes and functions. In some embodiments, the memory 108 may also store information about a user's contacts (names, addresses, phone numbers, etc.), scheduled appointments and events, notes, media assets such as audio, video, still images, or the like, that can be played by the terminal 10, along with metadata describing the media assets (e.g., asset name, artist, title, genre, etc.), playlists (lists of assets that can be played sequentially or in random order), and the like.

The memory 108 may also store application programs (also referred to herein as "applications" or "apps") which include any program executable by the processor(s) 104. For example, in one set of embodiments, an application may be a program that includes a user interface for enabling interaction with a user. In other embodiments, an application may be a process that runs in the background, such as a daemon. In some embodiments, certain applications may be installed on the terminal 10 by its manufacturer, while other applications may be installed by a user. Examples of application programs may include video game programs, personal information management programs, programs for playing media assets and/or navigating the media asset database, programs for controlling a telephone interface to place and/or receive calls, and so on. As indicated in the foregoing and shown in FIG. 10, one application program 126 may include instructions for performing a verification in relation to a server system providing a verification service. For example, the application program 126 may implement the terminal-side verification process as described with reference to FIGS. 1-9.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, a data processing apparatus. The computer readable medium can be a machine-readable storage device, a machine-readable storage substrate, a memory device, a composition of matter effecting a machine-readable propagated signal, or any combination thereof. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Embodiments of the invention may include combinations of the elements in the following numbered items:

1. A computer-implemented method performed by a software-controlled communication device associated with a subscription telephone number in a telephone network, said method comprising:
    operating a monitoring process to detect an incoming verification call and determine an identifier transmitted by the incoming verification call, said incoming verification call being initiated at a server system to verify an unconfirmed telephone number by placing the verification call to the unconfirmed telephone number; and
    transmitting, when the monitoring process detects the incoming verification call, a verification request to the server system, the verification request including the identifier, thereby allowing the server system to verify that the unconfirmed telephone number is a subscription telephone number assigned to the communication device by validating the identifier.

2. A computer-implemented method in a software-controlled server system connected to a data network, said server system providing a verification service, said method comprising:
    initiating a verification call from a telephone network to an unconfirmed telephone number from a calling telephone number;
    waiting for a verification request via the data network, said verification request including an originating telephone number of the verification call as determined by a communication device associated with the unconfirmed telephone number; and
    validating the unconfirmed telephone number by comparing the originating telephone number with the calling telephone number.

3. The method of item 2, further comprising: selecting the calling telephone number from a plurality of telephone numbers, and creating an association between the communication device and the calling telephone number, wherein the step of validating further comprises: determining the calling telephone number based on the verification request and said association.

4. The method of item 3, wherein the step of creating the association comprises: associating an identifier with the calling telephone number; and wherein the step of determining the calling telephone number comprises: retrieving the identifier from the verification request, and determining the calling telephone number based on the thus-retrieved identifier and said association.

5. The method of item 4, wherein the identifier comprises the unconfirmed telephone number.

6. The method of item 2, wherein the step of validating is deemed to fail if the originating telephone number differs from the calling telephone number, or if the verification request fails to arrive within a maximum time period.

7. The method of item 2, further comprising: transmitting, subsequent to the step of validating, a confirmation indicating whether the unconfirmed telephone number is a subscription telephone number or not.

8. The method of item 2, wherein the step of initiating the verification call comprises: transmitting a call request via the data network to a further server system providing a telephone service in the telephone network, the call request including the unconfirmed telephone number and the calling telephone number and causing the further server system to perform the verification call.

9. A non-transient computer-readable medium comprising program instructions that, when executed by a processor in a server system connected to a data network, performs the method of item 2.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The invention claimed is:

1. A computer-implemented method performed by a software-controlled user terminal associated with a subscription telephone number in a telephone network, said method comprising:
    detecting, by a monitoring process executed at the user terminal, an incoming call;
    determining, by the monitoring process executed at the user terminal, an originating telephone number of the incoming call;
    comparing, by the monitoring process executed at the user terminal, the originating telephone number to a set of predefined telephone numbers;
    determining, by the monitoring process executed at the user terminal, that the incoming call is a verification call based on the originating telephone number matching a telephone number of the set of predefined telephone numbers, wherein said verification call is initiated at a server system to verify an unconfirmed telephone number by placing the verification call to the unconfirmed telephone number from a calling telephone number; and transmitting, by the monitoring process executed at the user terminal, a verification request to the server system, the verification request including the originating telephone number of the verification call, thereby allowing the server system to verify that the unconfirmed telephone number is the subscription telephone number assigned to the user terminal by comparing the originating telephone number with the calling telephone number.

2. The method of claim 1, wherein the verification call is terminated at the user terminal without being answered.

3. The method of claim 1, wherein the monitoring process intercepts the verification call without notifying a user of the user terminal.

4. The method of claim 1, wherein the verification call is hidden from a user of the user terminal.

5. The method of claim 1, wherein the verification request further includes the unconfirmed telephone number.

6. The method of claim 1, further comprising, if the monitoring process fails to detect the verification call within a maximum time period, sending a fail message to the server system.

7. The method of claim 1, further comprising: receiving a status message from the server system indicating that verification by the server system has succeeded or failed.

8. The method of claim 1, further comprising: receiving a request for verification in relation to said server system; obtaining the unconfirmed telephone number; and transmitting an initial request for verification from the user terminal to the server system, the initial request including the unconfirmed telephone number and being configured to cause the server system to initiate the verification call from the telephone network to the unconfirmed telephone number from the calling telephone number.

9. The method of claim 1, wherein the set of predefined telephone numbers is stored in a memory of the user terminal.

10. A non-transient computer-readable medium comprising program instructions that, when executed by a processor in a user terminal associated with a subscription telephone number in a telephone network, performs the method of claim 1.

11. A computer-implemented verification system on a user terminal which is associated with a subscription telephone number in a telephone network, said verification system comprising:

a verification call detector software comprising program instructions that, when executed causes a processor in the user terminal to:
detect an incoming call;
determine an originating telephone number of the incoming call;
compare the originating telephone number to a set of predefined telephone numbers;
determine that the incoming call is a verification call based on the originating telephone number matching a telephone number of the set of predefined telephone numbers, wherein said verification call is initiated at a server system to verify an unconfirmed telephone number by placing the verification call to the unconfirmed telephone number from a calling telephone number; and a request handler software comprising program instructions that, when executed causes the processor in the user terminal to:
generate a verification request including the originating telephone number of the verification call, and
transmit the verification request to the server system, thereby allowing the server system to verify that the unconfirmed telephone number is the subscription telephone number assigned to the user terminal by comparing the originating telephone number with the calling telephone number.

12. The computer-implemented verification system of claim 11, further comprising an initial request handler configured to generate an initial request for verification, which includes the unconfirmed telephone number and is configured to cause the server system to initiate the verification call to the unconfirmed telephone number from the calling telephone number, and transmit the initial request to the server system via a data communication interface in the user terminal.

13. The computer-implemented verification system of claim 11, wherein the set of predefined telephone numbers is stored in a memory of the user terminal.

14. A computer-implemented verification server system connected to a data network by a data communication interface, said verification server system comprising:

a call initiation module software comprising program instructions that, when executed causes a processor in the verification server system to initiate a verification call to an unconfirmed telephone number from a calling telephone number; and a request handler software comprising program instructions that, when executed causes the processor in the verification server system to receive via the data communication interface a verification request including an originating telephone number of the verification call as determined by a user terminal associated with the unconfirmed telephone number, said verification call being distinguished from other calls to the user terminal by a determination, by the user terminal, that the originating telephone number matches a telephone number of a set of predefined telephone numbers stored in a memory of the user terminal;

wherein the request handler software is further configured, when receiving the verification request, to validate the unconfirmed telephone number by comparing the originating telephone number with the calling telephone number.

15. A method of verifying a user, comprising:
allowing the user to initiate a request for verification of an unconfirmed telephone number at a server system, so as to cause the server system to initiate a verification call from a telephone network to the unconfirmed telephone number from a calling telephone number; and
providing, to the user, a computer program for installation in a user terminal, said computer program being operable to:
detect an incoming call;
determine an originating telephone number of the incoming call;
compare the originating telephone number to respective telephone numbers of a set of predefined telephone numbers;

determine that the incoming call is the verification call based on the originating telephone number matching a telephone number of the set of predefined telephone numbers; and transmit a verification request to the server system, the verification request including the originating telephone number of the verification call, thereby allowing the server system to verify that the unconfirmed telephone number is a subscription telephone number assigned to the user terminal by comparing the originating telephone number with the calling telephone number.

\* \* \* \* \*